H. A. THORNDIKE.
FAN.
APPLICATION FILED MAY 21, 1917.
1,310,039.
Patented July 15, 1919.
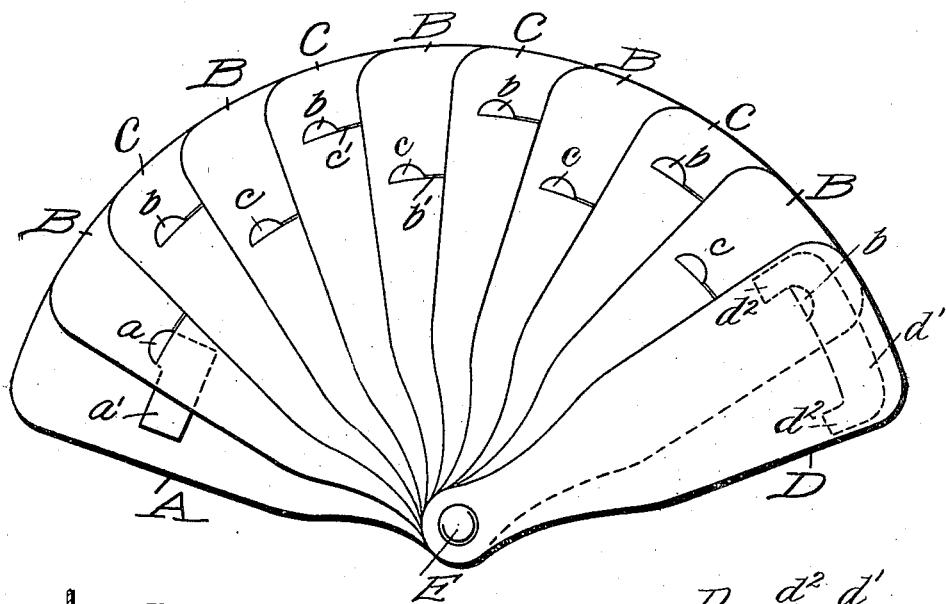
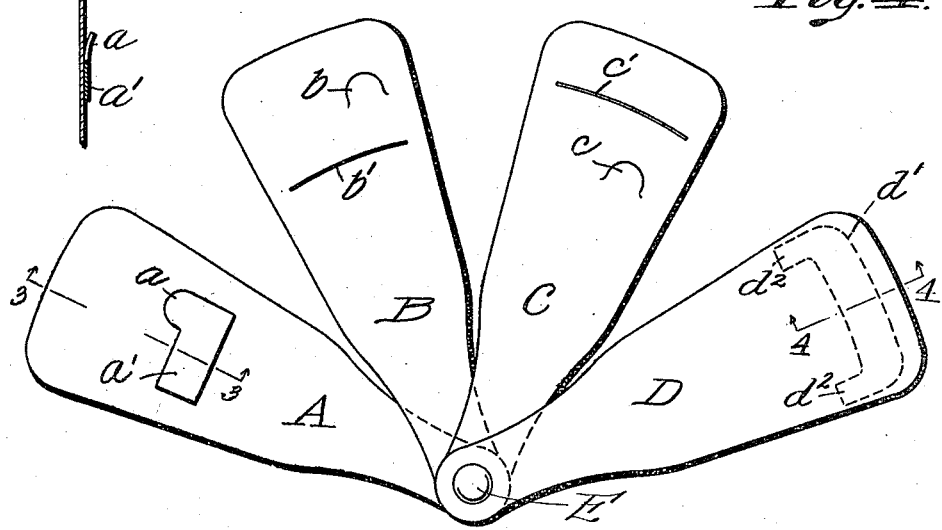
Inventor.
Herbert A. Thorndike
By Attorneys.

UNITED STATES PATENT OFFICE.

HERBERT A. THORNDIKE, OF FITCHBURG, MASSACHUSETTS, ASSIGNOR TO DIADEM MANUFACTURING COMPANY, OF FITCHBURG, MASSACHUSETTS, A CORPORATION OF MASSACHUSETTS.

FAN.

1,310,039.

Specification of Letters Patent.

Patented July 15, 1919.

Application filed May 21, 1917. Serial No. 169,815.

*To all whom it may concern:*

Be it known that I, HERBERT A. THORNDIKE, a citizen of the United States, residing at Fitchburg, in the county of Worcester and State of Massachusetts, have invented a new and useful Fan, of which the following is a specification.

This invention relates to a fan of the collapsible type.

The principal objects of the invention are to provide a fan which can be made of sheet material such as celluloid, stiff paper, or the like, and which will be simplified by eliminating the usual connections between the fan leaves which permit of folding; to provide a construction which when folded or collapsed will have its connecting members still in operative position so that they will not have to be connected by hand every time the fan is used; to provide a construction in which all connecting members independent of the leaves themselves are eliminated; to provide one in which the leaves can be made by ordinary stamping and cutting operations of the simplest character; and to provide a fan of this character in which the leaves will necessarily be close together so that there will be no passages therethrough for air and no strain on the pivot.

Reference is to be had to the accompanying drawings, in which—

Figure 1 is an elevation of a fan constructed in accordance with this invention and in expanded position;

Fig. 2 is a similar view with all the leaves removed except the front and back one and the two types of interior ones;

Fig. 3 is a sectional view on the line 3—3 of Fig. 2, and

Fig. 4 is a sectional view on the line 4—4 of Fig. 2.

In the drawings the fan is shown as made of flat leaves of sheet celluloid of four kinds designated A, B, C and D. There is only one each of the two outside leaves or plates A and D. The number of leaves B and C may be varied, but in the form shown there is one more of the leaves B than of the leaves C because a leaf B comes at each end of the series. Otherwise the leaves C alternate with them. All these leaves including the back and front plates are pivoted together by an eyelet or stud or other pivotal fastening device E at the bottom and at the ends of the leaves. The leaves B and C are very similar in character, each of them having an incision therethrough forming integral tongues $b$ and $c$ respectively. In the form shown the incisions and tongues are semi-circular. They are also provided with slots $b'$ and $c'$ respectively drawn on an arc from the center of the eyelet E. It will be seen however that the leaf B has its tongue $b$ beyond the slot $b'$, while the reverse is the case with the leaf C. The tongue $c$ is adapted to enter the slot $b'$ in the next leaf B on one side, while the tongue $b$ of the leaf B on the other side enters the slot $c'$ so that the tongue is at the same distance from the pivot as the slot in the next leaf on each side. They are made of this alternating construction so as to afford a convenient and simple means of connecting them together without materially weakening the construction of the leaves.

The back leaf or plate A is arranged to have a tongue $a$ projecting therefrom. Obviously no slot is required in this case. This tongue $a$ could be made in the same way as the tongue $c$, but as I prefer to make the back members A and B of relatively stiff material so that they may protect the thinner material forming the inner leaves. I prefer to form this tongue $a$ on a separate piece $a'$ cemented or otherwise secured to the face of the back plate A.

The member D also is made differently. It has to have a slot for receiving the tongue $b$ of the last inner leaf, and while it is within the province of this invention to make that slot the same as the slot $c'$ I prefer for reasons explained in connection with the description of the member A to secure a separate piece $d'$ on the back of the front plate D. This is cemented to it merely at the backs of two legs $d^2$ with which the piece $d'$ is provided, leaving the upper part free. This affords a slot between it and the rear surface of the plate D for the reception of a tongue $b$. It will be understood, of course, that the relative positions of the tongue $a$ and piece $d'$ could be reversed if desired without departing from the scope of the invention because the tongue $a$ could be arranged to enter a slot $c'$ and the piece $d'$ could be arranged to receive a tongue $c$ without violating the principles of this invention.

From what has been said it will be obvious that when the fan is folded up the tongues a, b and c will not be disengaged from their respective slots, but will remain in them and that the slots, all of them including the piece d', will limit the closing motion as well as the opening motion. Further, it will be seen when it is desired to open the fan it is merely done by pulling the members apart in the way that is well known in connection with ordinary fans, and this motion is also limited by the slots and takes place in the planes of the respective leaves. In this way the inner leaves can be made of very light material because the slots and tongues are spaced from each other a material distance and do not greatly weaken the construction. The principles can be carried out for fans expansible to any desired arc. The construction is such that the leaves always lie flat against each other without leaving any spaces between them for the passage of air.

Although I have shown and described only a single form of the invention I am aware of the fact that many modifications can be made therein by any person skilled in the art without departing from the scope of the invention as expressed in the claims. Therefore, I do not wish to be limited to all the details of construction herein shown and described, but what I do claim is:—

1. As an article of manufacture, a fan comprising two outside plates and an odd number of leaves of only two forms pivoted together and alternately arranged, free from each other at their edges, and having means thereon for limiting the swinging motion of the leaves and plate in both directions, said means consisting of tongues located on all the leaves and on one plate and slots in all the leaves for receiving the tongues, said plates being free from slots extending through them, but one having means on the inner side for entering the slot in a leaf and the other having means on the inner side for receiving the tongue of a leaf.

2. As an article of manufacture, a fan comprising two outside plates and an odd number of leaves of two kinds pivoted together and alternately arranged, free from each other at their edges, and having means thereon for limiting the swinging motion of the leaves and plates in both directions, said means consisting of tongues located on all the leaves and on only one plate and slots in all the leaves for receiving the tongues, one plate having a tongue and the other a separate piece secured to its back for receiving a tongue between it and the back, said plates being free from slots extending through them.

3. As an article of manufacture, a leaf for a fan having at one end a pivot and near the other end a slit therethrough forming a tongue extending away from the pivot and also a slot therethrough spaced radially from the tongue for receiving a similar tongue and curved on an arc having said pivot as its center.

In testimony whereof I have hereunto affixed my signature.

HERBERT A. THORNDIKE.